July 24, 1923.
C. H. LISTER
RECIPROCATING CONVEYER
Filed Nov. 21, 1921
1,462,510
2 Sheets-Sheet 1
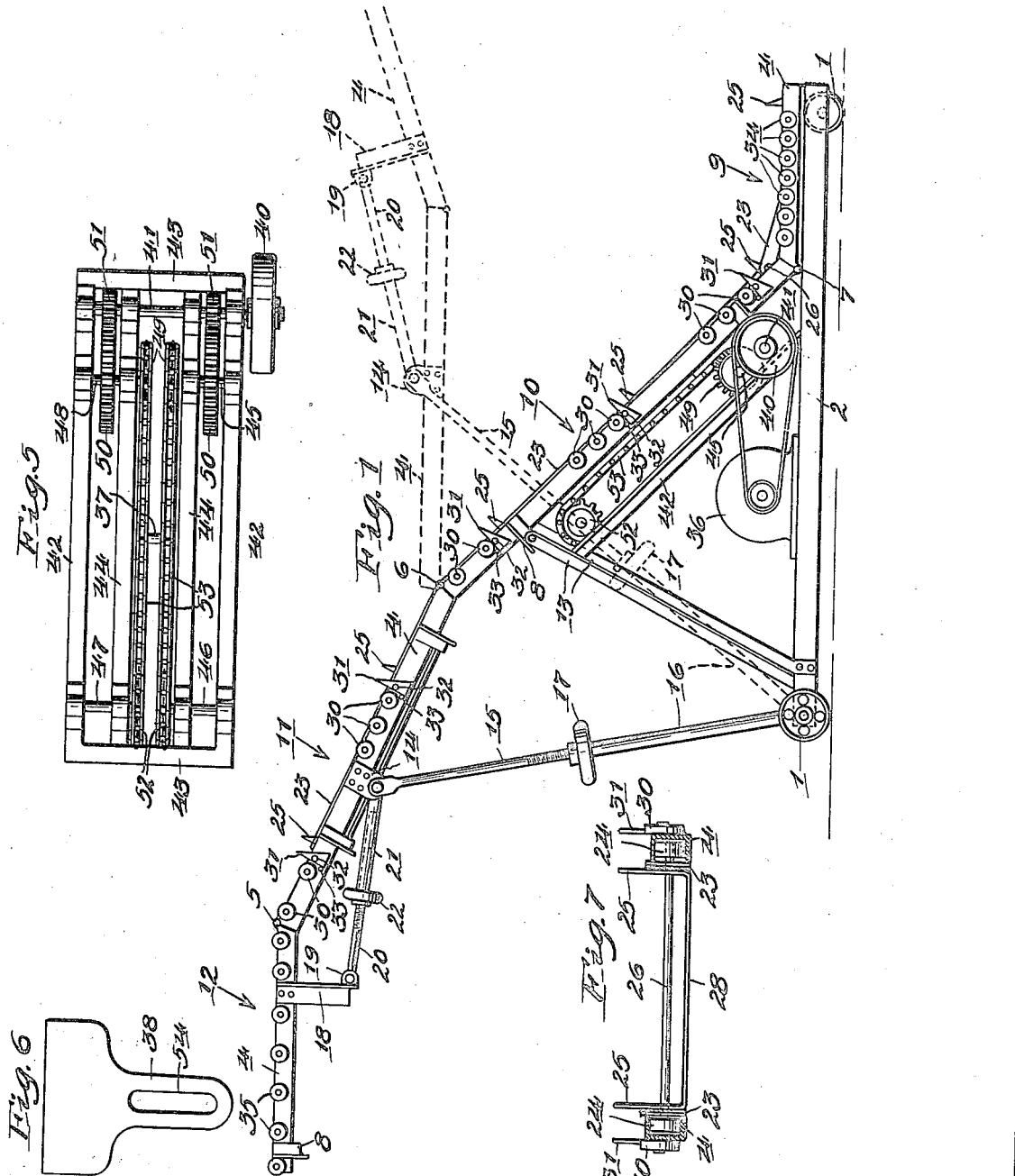
Inventor:
Charles H. Lister,
by: John E. Thyke
his Attorney.

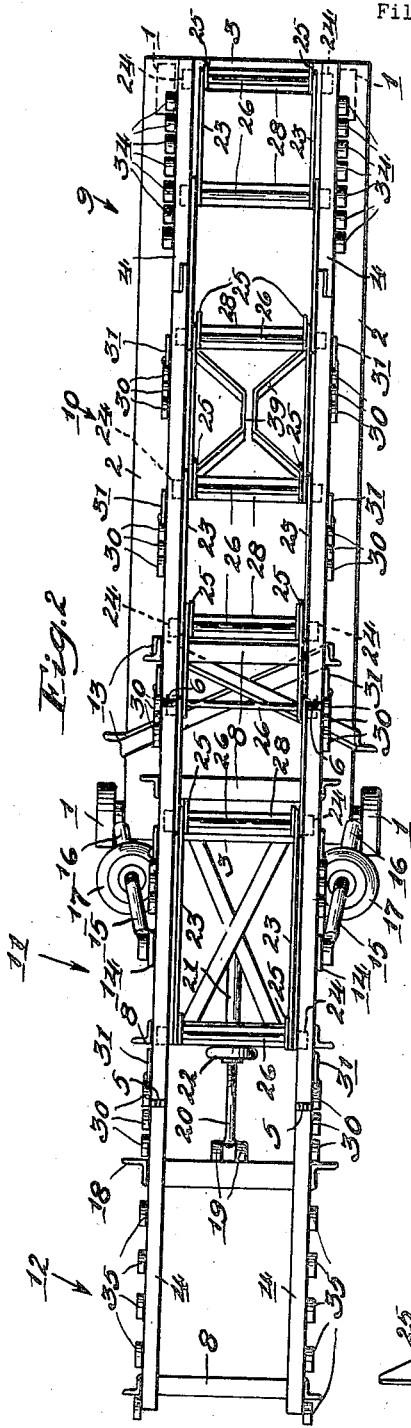

Patented July 24, 1923.

1,462,510

UNITED STATES PATENT OFFICE.

CHARLES H. LISTER, OF NORTH ST. PAUL, MINNESOTA, ASSIGNOR TO STANDARD CONVEYOR COMPANY, A CORPORATION OF MINNESOTA.

RECIPROCATING CONVEYOR.

Application filed November 21, 1921. Serial No. 516,619.

*To all whom it may concern:*

Be it known that I, CHARLES H. LISTER, a citizen of the United States, residing at North St. Paul, in the county of Ramsey and State of Minnesota, have invented new and useful Improvements in Reciprocating Conveyers, of which the following is a specification.

It is my object to provide novel and efficient means for transporting boxes, packages or the like from one place to another and for raising such articles from a lower to a higher level.

Another object of my invention is to provide a novel inclined elevator of the reciprocating type, wherein the packages to be transported are moved step by step from one rest station to the next.

A further object of my invention is to provide a device of this kind which is portable and adjustable vertically so that the packages may be delivered between varying levels.

A still further object of my invention is to provide a portable inclined elevator which may be folded upon itself to facilitate movement so that the elevator may be moved through restricted openings such as doorways.

Another object of my invention is to provide a conveyer of this type with novel means for imparting reciprocating motion to the carriers.

Other objects of my invention will appear and be more fully pointed out in the following specification and claims.

In the accompanying drawings, which illustrate the best form of my device at present known to me, Fig. 1 is a side elevation of my improved reciprocating conveyer; Fig. 2 is a plan view of the same; Fig. 3 is an enlarged fragmentary portion of a conveyer with one guide channel removed, boxes being shown on the rest stations; Fig. 4 is a detail perspective view of a pair of the push lugs detached from the carriers; Fig. 5 is a plan view of the mechanism for producing reciprocating motion; Fig. 6 is a detail elevation of the Scotch yoke of the reciprocating mechanism and Fig. 7 is a section taken on the line 7—7 of Fig. 1.

Referring to the drawings, my improved conveyer is supported upon four wheels 1 which are journalled near the ends of a base frame consisting of longitudinal angle irons 2 and transverse angle irons 3. The conveyer proper, which is supported on this base frame, consists of parallel guide channels 4 arranged in sections which are joined end to end by hinges 5, 6 and 7. Transverse angle irons 8 are joined at their ends to the outer faces of the guide channels 4 to form cross braces beneath said channels. Thus, the conveyer proper is divided into a horizontal section 9, a rigid inclined section 10 and adjustable sections 11 and 12. The section 9 is rigidly secured to the angle irons 2 and the section 10, which is joined by hinges 7 to the section 9 is supported in inclined position by a pair of crossed angle irons 13. These supporting angle irons are fastened to the outer faces of the angle irons 2 at their lower ends and similarly fastened at their upper ends to one of the cross braces 8 near the upper extremity of section 10. Rigidly fastened on the outer surfaces of the guide channels 4 of the section 11 are a pair of ears 14 to which the upper ends of adjusting rods 15 are pivotally attached. The lower ends of the rods 15 are slidable in tubes 16 which are pivotally supported on the angle irons 2 at their lower ends. Hand wheels 17 are provided with internally threaded hubs, which are adapted to receive the externally threaded lower ends of the rods 15. Thus the rods 15 pass axially through the wheels 17 into the tubes 16 and the wheels 17 are supported on the upper ends of said tubes. By turning the wheels 17 the rods 15 may be moved upward or downward to raise or lower the upper end of section 11 and the section 12.

The latter section, which is connected with section 11 by the hinges 5, is provided with a rigid transverse angle iron 18 and ears 19, fixed on said angle iron intermediate and beneath the channels 4. The ears 19 are pivotally joined to one end of an adjusting rod 20, the other end of said rod being threaded and adapted to pass into the tube 21. A hand wheel 22, similar to the hand wheel 17, engages the adjacent end of the tube 21 and threads on the rod 20 to allow adjustment of said rod in said tube.

Carriers, for moving packages in step by step movement from the section 9 up the inclined sections 10 and 11 to the section 12, consist of a series of links 23 provided with rollers 24 which run in the channels 4 and a series of tiltable push lugs 25 which engage the packages. The links 23 are jointed at suitable intervals to permit them to pass the junctions of the several sections and the push lugs 25 are mounted at regular intervals on the carriers by means of rods 26, which pass through perforations 27 in said lugs and also form the pivot pins of the adjacent links 23 and the axles of the rollers 24 (see Fig. 7). The lugs 25 are joined in pairs by horizontal strips 28 which form weights on the lower ends of said lugs to hold them normally in vertical position. Stop pins 29 (Fig. 3) prevent backward tilting of the lugs 25, but said lugs are free to tilt forward so that they may pass beneath packages on the rest stations.

The rest stations consist of a series of groups of anti-friction wheels 30 mounted on the outer faces of the channels 4 and detents 31 mounted in pairs at the lower or rearward end of each group of anti-friction wheels to prevent backward movement of packages. These detents 31 are tiltable on pins 32 and provided with stops 33 to limit backward tilting movement. The detents 31 are substantially triangular in outline and are mounted with the larger end down so that they will normally remain erect in contact with the stops 33. The upper peripheries of the anti-friction wheels 30 are above the upper edges of the adjacent links 23 so that packages on said wheels will be raised free of said links during the backward movement of the carriers as hereinafter described. Groups of anti-friction wheels 34 and 35 are mounted on the channels 4, respectively, on the sections 9 and 12.

Means for imparting reciprocating movement to the links 9, carrying the lugs 25, consists of a motor 36 adapted to drive a pair of endless chains 53, a pin 37 joining said chains and a Scotch yoke 38 (Fig. 6) connecting said pin with a pair of bars 39 rigidly joined to said links. The motor 36 is supported on the longitudinal angle irons 2 of the base frame and said motor, by means of a suitable belt, drives a pulley 40 fast on a shaft 41. This shaft 41 is journalled in suitable bearings supported on a frame which consists of longitudinal angle irons 42, transverse angle irons 43 and slats 44, extending parallel to the angle irons 42 between the transverse angle irons 43. This frame also supports the bearings for four short shafts 45, 46, 47 and 48 which are arranged in pairs. The shafts 45 and 48 are in axial alignment with sprocket gears 49, mounted on their adjacent ends and spur gears 50 fast on said shafts between the angle irons 42 and slats 44. The gears 50 mesh with pinions 51 mounted on the shaft 41. Sprocket gears 52, similar to the gears 49, are fast on adjacent ends of the shafts 46 and 47, said shafts being arranged in axial alignment, and a pair of endless chains 53 are driven in parallel relation by the gears 49 around said gears and the gears 52. The pin 37 connects the chains 53, is carried thereby, and fits and is slidable in a slot 54, in the yoke 38, the upper end of said yoke being rigidly secured between adjacent faces of the bars 39. The ends of these bars are secured in suitable manner to the inner faces of the adjacent links 23.

*Operation.*

In operation packages to be transported are delivered by a suitable conveyer or by hand to the wheels 34 of the section 9 and the motor 36 is started to rotate the shaft 41. Rotary motion of this shaft is transmitted by the pinions 51 to the gears 50 and thence by the shafts 45 and 48 to the sprocket gears 49. These gears drive the chains 53 in parallel relation, and the pin 37, running in the slot 54 of the yoke 38, carries said yoke, together with the parts connected thereto, first in one direction while said pin is carried between the upper runs of the chains 53 and then in the opposite direction when said pin is carried between the lower runs of said chains. In practice the stroke thus imparted to the carrier mechanism may be made any desired length but it is thought that 4 feet is desirable for carrying many kinds and sizes of packages. Thus, reciprocating movement is imparted to the links 23 and the rollers 24, running in the guide channels 4, conserve the power expended in the reciprocating motion. Assuming a package to be on the section 9, on the downward or backward stroke of the carriers, the end push lugs 31 will be brought into contact with the forward edge of the package, will tilt as indicated in Fig. 3 and then pass beneath the package until freed to rise to vertical position at the backward end of this package. At the end of the backward stroke the lugs will rise and at the beginning of the forward stroke will engage the backward edge of the package. The package will now be carried forward on the wheels 34 and then upon the upper edges of the links 23 to the first rest station, which is a distance slightly less than the length of stroke from the lower end of the carrier. The rest station wheels 31 will raise the package free of the links 23. As soon as the package has passed the detents 31, at the bottom of this first station, said detents will rise and as the carriers start on the reverse stroke, said detents will hold the packages on the station. If there is another package on the section 9 the above operation will be repeated and upon the next forward stroke the package which has been delivered to the first rest station on the section 10 will be moved to the intermediate station of said section. Thus, as the reciprocating movement of the carriers continues, packages are carried from station to station of the sections 10 and 11 to the section 12. From the latter section the packages may be delivered by a suitable gravity carrier or removed and disposed of by hand.

My reciprocating conveyer is peculiarly adapted for use in piling boxes or the like in warehouses. When thus used the base of the carrier may be moved on the wheels 1 to the desired pile and by means of the hand wheels 17 and 22, the advanced end of the section 12 is placed at the desired height. Packages are now transported to the section 12 as described above and when it becomes necessary to change the height to which the packages are delivered the hand wheels 12 and 22 are again operated in the appropriate direction. When moving my conveyer from place to place where there is limited floor space and to allow the device to be moved through doorways, the sections 11 and 12 are folded, as indicated in dotted lines in Fig. 1. To do this the hand wheels are first turned to increase the length of the supports until the section 11 is tilted past dead center and then the length of said supports are decreased to bring the sections 11 and 12 downward over the sections 9 and 10.

While in the drawings I have shown antifriction wheels on the rest stations it is obvious that said stations might be constructed without the use of such wheels. Thus tapered blocks might be secured to the upper surfaces of the guide channels 4 in place of the wheels 30.

Having described my invention what I claim as new and desire to protect by Letters Patent is:

1. In a reciprocating conveyer, spaced guide rails, supports for said rails, a carrier movable longitudinally on said rails, means for imparting reciprocating motion to said carrier, push lugs tiltably mounted on said carrier. spaced rest stations on said rails and means for causing said push lugs to normally project to engage packages on said carrier and rest stations.

2. In a reciprocating conveyer, spaced guide rails, supports for said rails, a carrier supported by rollers on said rails, means for imparting reciprocating motion to said carrier, pairs of push lugs tiltably mounted on said carrier, raised rest stations mounted at regular intervals on said rails, means for causing said lugs to normally rise to substantially vertical position and stops to prevent backward tilting of said lugs.

3. In a reciprocating conveyer, inclined guides, linked carriers supported by rollers on said guides, means for imparting reciprocating motion to said carriers, rest stations mounted at intervals on said guides, push lugs tiltably mounted on said carriers and arranged to engage packages for moving the same up the incline formed by said guides and means for preventing packages from moving downward from said rest stations.

4. In a reciprocating conveyer, guides formed in sections and hinged end to end, one of said sections being substantially horizontal and another of said sections being inclined, an adjustable support for said inclined section, linked carriers supported by rollers on said guides, means for imparting reciprocating motion to said carriers, rest stations mounted at intervals on said guides, push lugs tiltably mounted on said carriers and arranged to engage packages for moving the same up the incline formed by said guides and means for preventing packages from moving downward from said rest stations.

5. In a reciprocating conveyer, guides formed in sections and hinged end to end, a rigid support for one of said sections, an adjustable support for another of said sections, said last mentioned section being inclined, linked carriers supported by rollers on said guides, means for imparting reciprocating motion to said carriers, rest stations mounted at intervals on said guides, push lugs tiltably mounted on said carriers and arranged to engage packages for moving the same up the incline formed by said guides and means for preventing packages from moving downward from said rest stations.

6. In a reciprocating conveyer, a pair of parallel guide channels, supports for said channels, carriers supported by rollers in said channels, means for imparting reciprocating motion to said carriers. push lugs tiltably mounted in pairs on said carriers, rest stations mounted at regular intervals on said guides, means for causing said lugs to normally rise to substantially vertical position and stops to prevent backward tilting of said lugs.

7. In a conveyer, parallel guides, supports for said guides, carriers slidable longitudinally adjacent to and supported by said guides, means for imparting reciprocating motion to said carriers, push lugs tiltably mounted on said carriers, groups of antifriction wheels arranged at intervals on said guides to form raised rest stations and means for causing said push lugs to engage packages on said carriers and wheels during movement in one direction and to pass beneath said packages during movement in the reverse direction.

8. In a conveyer, spaced guide rails, supports for said rails, a carrier movable longitudinally on said rails, means for imparting reciprocating motion to said carrier, push lugs tiltably mounted on said carrier, spaced rest stations mounted on said rails and raised above said carrier to permit carrier to pass freely beneath packages on said stations and means for causing said push lugs to normally project and engage packages on said carrier and rest stations.

9. In a conveyor, parallel guides formed in four sections, hinged end to end, one of said sections being substantially horizontal, another of said sections rigidly supported in inclined position and the remaining two sections adjustably supported in continuation of said horizontal and first mentioned inclined sections, linked carriers supported by rollers on said guides, means for imparting reciprocating motion to said carriers, rest stations mounted at intervals on said guides, push lugs tiltably mounted on said carriers and detents tiltably mounted at the base of each of said rest stations to prevent downward movement of packages from said stations.

10. In a conveyer, a substantially horizontal base supported on wheels, guide channels mounted in inclined position on said base, a carrier supported on rollers in said guide channels, push lugs tiltably supported on said carriers, rest stations mounted at intervals on said channels and means for imparting reciprocating motion to said carriers whereby packages are moved step by step up the incline formed by said channels.

11. In a conveyer, parallel guides, a base provided with wheels, supports for said guides mounted on said base, carriers supported by rollers on said guides, means for imparting reciprocating motion to said carriers, push lugs tiltably mounted in pairs on said carriers, raised rest stations mounted at regular intervals on said guides, means for causing said lugs to normally rise to substantially vertical position and stops to prevent backward tilting of said lugs.

In testimony whereof, I have hereunto signed my name to this specification.

CHARLES H. LISTER.